United States Patent
Wu et al.

(10) Patent No.: US 10,736,168 B2
(45) Date of Patent: Aug. 4, 2020

(54) DEVICE AND METHOD OF HANDLING USER PLANE EVOLVED PACKET SYSTEM OPTIMIZATION PROCEDURE

(71) Applicant: HTC Corporation, Taoyuan (TW)

(72) Inventors: Chih-Hsiang Wu, Taoyuan (TW); Te-Ming Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 64 days.

(21) Appl. No.: 15/475,091

(22) Filed: Mar. 30, 2017

(65) Prior Publication Data
US 2017/0290084 A1 Oct. 5, 2017

Related U.S. Application Data

(60) Provisional application No. 62/316,595, filed on Apr. 1, 2016.

(51) Int. Cl.
*H04W 76/27* (2018.01)
*H04W 76/30* (2018.01)
(Continued)

(52) U.S. Cl.
CPC ......... *H04W 76/27* (2018.02); *H04W 36/08* (2013.01); *H04W 76/10* (2018.02); *H04W 76/30* (2018.02); *H04W 48/12* (2013.01); *H04W 76/19* (2018.02)

(58) Field of Classification Search
CPC ... H04W 76/046; H04W 36/08; H04W 76/02; H04W 76/06
See application file for complete search history.

(56) References Cited

U.S. PATENT DOCUMENTS

| | | | | |
|---|---|---|---|---|
| 8,548,469 B1 * | 10/2013 | Hietalahti | ............. | H04W 76/18 455/435.1 |
| 8,655,305 B2 * | 2/2014 | Tiwari | ................. | H04W 76/50 455/404.1 |

(Continued)

FOREIGN PATENT DOCUMENTS

| | | |
|---|---|---|
| CN | 102123477 A | 7/2011 |
| CN | 102868976 A | 1/2013 |

(Continued)

OTHER PUBLICATIONS

"RRC connection Suspend and Resume", 3GPP TSG-RAN WG2 NB-IOT adhoc meeting, Hungary Jan. 19-21, 2016.*

(Continued)

*Primary Examiner* — Muthuswamy G Manoharan
(74) *Attorney, Agent, or Firm* — Winston Hsu

(57) ABSTRACT

A communication device for handling a User Plane Evolved Packet System (EPS) Optimization procedure comprises a storage unit for storing instructions and a processing circuit coupled to the storage unit. The processing circuit is configured to execute the instructions stored in the storage unit. The instructions a RRC layer of the communication device receiving system information from a cell of a network; the RRC layer informing an EPS mobility management (EMM) layer of the communication device that a User Plane EPS Optimization functionality (e.g., a resume/suspend functionality) is allowed in the cell, when the system information indicates that the User Plane EPS Optimization functionality is allowed; and the RRC layer informing the EMM layer that the User Plane EPS Optimization functionality is not allowed in the cell, when the system information indicates that the User Plane EPS Optimization functionality is not allowed.

6 Claims, 4 Drawing Sheets

(51) Int. Cl.
*H04W 76/10* (2018.01)
*H04W 36/08* (2009.01)
*H04W 48/12* (2009.01)
*H04W 76/19* (2018.01)

(56) References Cited

U.S. PATENT DOCUMENTS

| | | | |
|---|---|---|---|
| 9,237,594 B2 | 1/2016 | Yang | |
| 9,516,576 B2* | 12/2016 | Lee | H04W 48/08 |
| 2013/0182555 A1* | 7/2013 | Raaf | H04W 36/0033 370/216 |
| 2016/0128007 A1* | 5/2016 | Keskitalo | H04W 56/001 370/350 |
| 2018/0376531 A1* | 12/2018 | Martinez Tarradell | H04W 76/27 |

FOREIGN PATENT DOCUMENTS

| | | |
|---|---|---|
| CN | 103703862 A | 4/2014 |
| WO | 2015174781 A1 | 11/2015 |
| WO | WO 2017/123417 * 7/2017 | H04W 76/02 |

OTHER PUBLICATIONS

ETSI TS 124 301 V13.5.0 (Apr. 2016).
ETSI TS 136 331 v13.1.0 (Apr. 2016).
3GPP TSG-RAN WG2 Meeting #93, Feb. 15-19, 2016, R2-162068.
3GPP TSG-SA WG2 #113AH, Feb. 23-26, 2016, S2-161228.
Search Report dated Jul. 28, 2017 for EP application No. 17163949.5, pp. 1-4.
Qualcomm Incorporated, "Core Network node selection for CIOT", SA WG2 Meeting #113AH S2-161062, Feb. 23-26, 2016, Sophia Antipolis, France, p. 1-4.
Nokia, RRC layer impacts and System information usage in attach procedure, 3GPP TSG SA WG2 Meeting #114 S2-161906, Sophia Antipolis, France, Apr. 11-15, 2016, p. 1-15.
Qualcomm Incorporated, "New cause for attach reject by Rel.13 MME", 3GPP TSG-CT WG1 Meeting #97 C1-162154, Ljubljana (Slovenia), Apr. 11-15, 2016, p. 1-7.
Office action dated Apr. 26, 2019 for the China application No. 201710214692.3, filing date Apr. 1, 2017, p. 1-5.

* cited by examiner

DEVICE AND METHOD OF HANDLING USER PLANE EVOLVED PACKET SYSTEM OPTIMIZATION PROCEDURE

CROSS REFERENCE TO RELATED APPLICATIONS

This application claims the benefits of U.S. Provisional Application No. 62/316,595, filed on Apr. 1, 2016, which is incorporated herein by reference.

BACKGROUND OF THE INVENTION

1. Field of the Invention

The present invention relates to a communication device and a method used in a wireless communication system, and more particularly, to a communication device and a method of handling a User Plane Evolved Packet System Optimization procedure.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) using LTE, etc. For a UE and an eNB to communicate with each other in the LTE-A system, the UE and the eNB must support standards developed for the LTE-A system, such as the 3rd Generation Partnership Project (3GPP) Rel-10 standard or later versions.

3GPP standard (e.g., 3GPP TS 24.301 v13.5.0 section 5.3.1.3) states that "Suspend of the NAS signalling connection can be initiated by the network in EMM-CONNECTED mode when a User plane Evolved Packet System (EPS) optimization is used. Resume of the suspended NAS signalling connection is initiated by the UE." In addition, 3GPP standard (e.g., 3GPP 23.401_CR2930R11_CIoT_(Rel-13)_ S2-161228 section 4.x) states that "The User Plane EPS Optimization functionality enables support for transfer of user plane data without the need for using the Service Request procedure to establish AS context in the serving eNB and UE. As a precondition the UE needs to perform an initial connection establishment that establishes the AS bearers and the AS security context in the network and UE and the radio resource control (RRC) connection is suspended by means of a Connection Suspend Procedure. At any subsequent transaction trigger from the NAS layer when the UE is in ECM-IDLE, the UE shall attempt the Connection Resume procedure".

The network may broadcast an indication in system information to indicate whether a resume/suspend functionality (a User Plane EPS Optimization functionality) is allowed in a cell or not. However, the User Plane EPS Optimization functionality of the system information is received in a RRC layer of the UE, and a NAS layer of the UE does not know the User Plane EPS Optimization functionality. In addition, a RRC connection resume procedure is triggered by the NAS layer rather than the RRC layer. Thus, the NAS layer may trigger the RRC connection resume procedure when the network doesn't allow this.

Thus, how to synchronize the User Plane EPS Optimization functionality between the RRC layer and the NAS layer of the UE when performing a RRC connection related to the User Plane EPS Optimization functionality is a problem to be solved.

SUMMARY OF THE INVENTION

The present invention therefore provides a communication device and a method for handling a User Plane Evolved Packet System (EPS) Optimization procedure to solve the abovementioned problem.

A communication device for handling a User Plane EPS Optimization procedure comprises a storage unit for storing instructions and a processing circuit coupled to the storage unit. The processing circuit is configured to execute the instructions stored in the storage unit. The instructions a radio resource control (RRC) layer of the communication device receiving system information from a cell of a network; the RRC layer informing an EPS mobility management (EMM) layer of the communication device that a User Plane EPS Optimization functionality (e.g., a resume/suspend functionality) is allowed in the cell, when the system information indicates that the User Plane EPS Optimization functionality is allowed; and the RRC layer informing the EMM layer that the User Plane EPS Optimization functionality is not allowed in the cell, when the system information indicates that the User Plane EPS Optimization functionality is not allowed.

A communication device for handling a User Plane EPS Optimization procedure comprises a storage unit for storing instructions and a processing circuit coupled to the storage unit. The processing circuit is configured to execute the instructions stored in the storage unit. The instructions a RRC layer of the communication device receiving system information from a cell of a network; an EMM layer of the communication device requesting the RRC layer to perform a RRC connection resume procedure, by transmitting a resume request to the RRC layer; the RRC layer transmitting a RRC connection resume request message to the network, if a RRC connection is suspended and the system information indicating that a User Plane EPS Optimization functionality is allowed in the cell, when the RRC layer receives the resume request from the EMM layer; and the RRC layer transmitting a RRC Connection Request message to the network, if the RRC connection is suspended and the system information indicating that the User Plane EPS Optimization functionality is not allowed in the cell, when the RRC layer receives the resume request from the EMM layer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
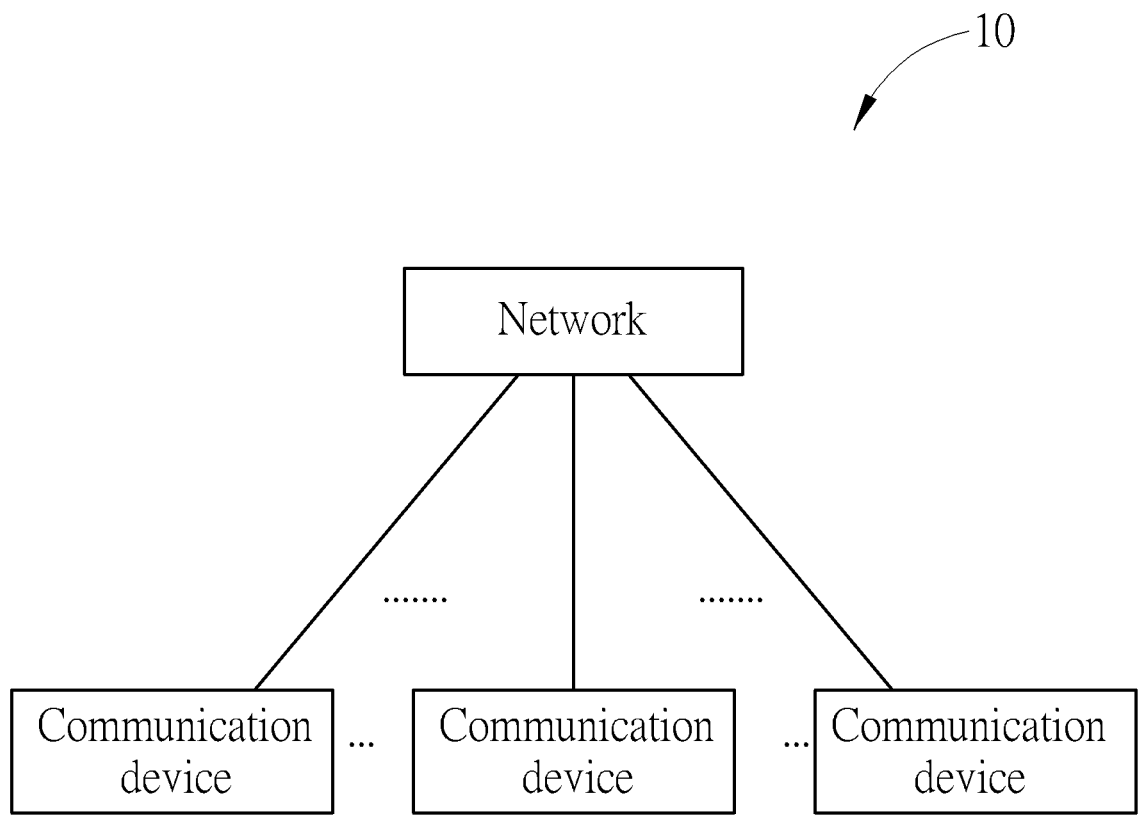
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) and/or a Radio Network Controller (RNC) in a universal mobile telecommunications system (UMTS). In one example, the network may be an evolved UTRAN (E-UTRAN) comprising at least one evolved NB (eNB) and/or at least one relay in a long term evolution (LTE) system, a LTE-Advanced (LTE-A) system or an evolution of the LTE-A system. In one example, the network may be a fifth generation (5G) network including at least one 5G base station (BS) which employs orthogonal frequency-division multiplexing (OFDM) and/or non-OFDM, and transmission time interval smaller than 1 millisecond (ms) for communication with the communication devices. In general, a BS may also be used to refer any of the NB, the RNC, the eNB and the 5G BS.

Furthermore, the network may also include both the UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a mobile phone, a laptop, a tablet computer, an electronic book, a portable computer system, a vehicle or aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
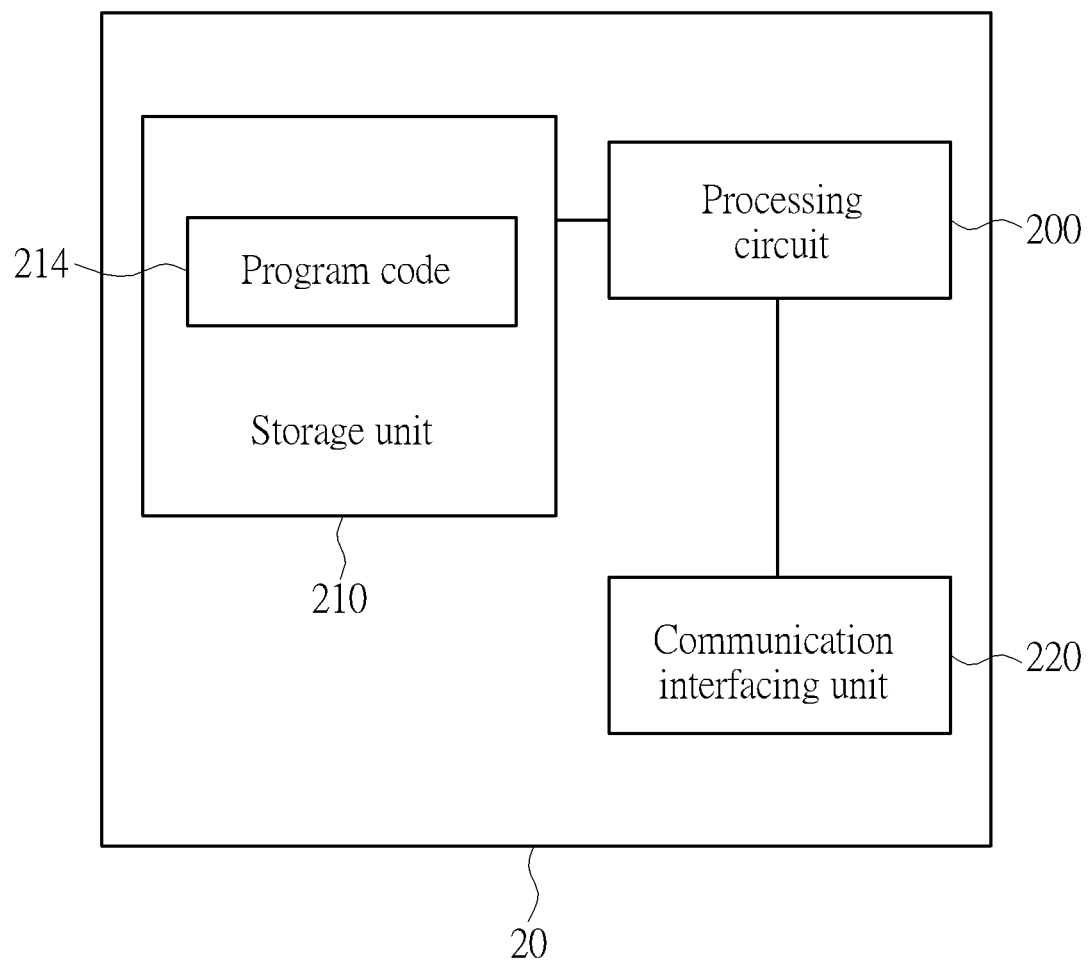
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent a communication device in FIG. 1, to simplify the illustration of the embodiments.

Figure 3:
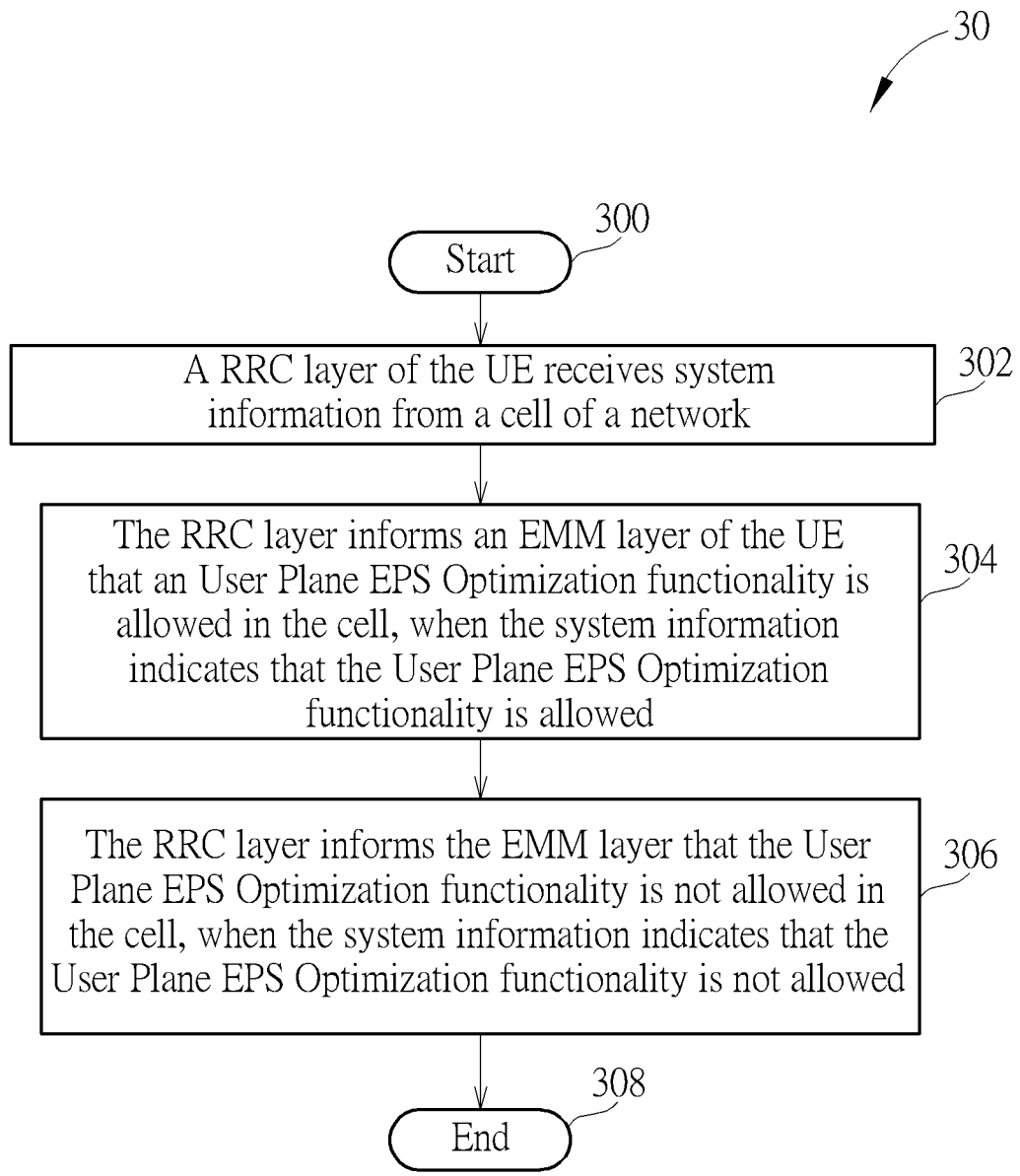
FIG. 3 is a flowchart of a process according to an example of the present invention.

FIG. 3 is a flowchart of a process 30 according to an example of the present invention. The process 30 may be utilized in a UE for handling a User Plane Evolved Packet System (EPS) Optimization procedure. The process 30 includes the following steps:

Step 300: Start.

Step 302: A radio resource control (RRC) layer of the UE receives system information from a cell of a network.

Step 304: The RRC layer informs an EPS mobility management (EMM) layer of the UE that a User Plane EPS Optimization functionality is allowed in the cell, when the system information indicates that the User Plane EPS Optimization functionality is allowed.

Step 306: The RRC layer informs the EMM layer that the User Plane EPS Optimization functionality is not allowed in the cell, when the system information indicates that the User Plane EPS Optimization functionality is not allowed.

Step 308: End.

According to the process 30, a RRC layer of the UE may receive system information from a cell (e.g., a serving cell) of a network. Then, the RRC layer may inform an EPS mobility management (EMM) layer of the UE that a User Plane EPS Optimization functionality (e.g., a resume/suspend functionality) is allowed in the cell, when the system information indicates that the User Plane EPS Optimization functionality is allowed. The RRC layer may inform the EMM layer that the User Plane EPS Optimization functionality is not allowed in the cell, when the system information indicates that the User Plane EPS Optimization functionality is not allowed. That is, the RRC layer may inform the EMM layer whether the User Plane EPS Optimization functionality is allowed in the cell, according to the system information received from the network. In other words, a RRC connection resume procedure is not performed (e.g., triggered) in a cell that does not support (allow) the User Plane EPS Optimization functionality. Thus, the problem of synchronizing the User Plane EPS Optimization functionality is solved according to the process 30.

Realization of the process 30 is not limited to the above description. The following examples may be applied to the process 30.

In one example, the EMM layer may indicate the RRC layer to perform a RRC connection establishment procedure if the EMM layer initiates a procedure to transmit an EMM message or data (e.g., internet protocol (IP) data or non-IP data), after the EMM layer is informed by the RRC layer that the User Plane EPS Optimization functionality is not allowed in the cell. In one example, the EMM layer may indicate the RRC layer to perform a RRC connection resume procedure if the EMM layer initiates a procedure to transmit an EMM message or data (e.g., IP data or non-IP data), after the EMM layer is informed by the RRC layer that the User Plane EPS Optimization functionality is allowed in the cell. That is, the EMM layer may indicate the RRC layer to perform the RRC connection establishment procedure or the RRC connection resume procedure, according to whether the User Plane EPS Optimization functionality is allowed in the cell.

In one example, the EMM layer may request the RRC layer to perform the RRC connection establishment procedure, by transmitting a connection request, and at least one of a system architecture evolution (SAE)-temporary mobile subscriber identity (S-TMSI), a MME group identity (ID), and a MME code to the RRC layer. The RRC layer may transmit a RRC Connection Request message (e.g., RRCConnectionRequest) to the network, after receiving the connection request from the EMM layer. Then, the RRC layer may receive a RRC Connection Setup message (e.g., RRCConnectionSetup) from the network, after transmitting the RRC Connection Request message. The UE may enter a connected mode, when the RRC layer receives the RRC Connection Setup message. The RRC layer may transmit a RRC Connection Setup Complete message (e.g., RRCConnectionSetupComplete) with the MME group ID and the MME group to the network. The UE may transmit (receive) data to (from) the network, after the RRC layer transmits the RRC Connection Setup Complete message to the network.

In one example, the RRC layer may inform the EMM layer whether the User Plane EPS Optimization functionality is allowed in the cell, when a RRC connection is suspended and the RRC layer receives the system information, or when the EMM layer requests the RRC layer to report a state of the User Plane EPS Optimization functionality. In one example, the EMM layer requests the RRC layer to report the state of the User Plane EPS Optimization functionality, when the EMM layer requests the RRC layer to initiate a RRC connection resume procedure, or when the EMM layer receives a RRC connection suspended indication from the RRC layer.

In one example, the RRC layer may reacquire the system information to determine whether the User Plane EPS Optimization functionality is allowed in the cell, after the EMM layer requests the RRC layer to report the state of the User Plane EPS Optimization functionality, before the RRC layer transmits an indication to the EMM layer. In one example, the RRC layer may transmit an indication to the EMM layer according to the system information to indicate whether the User Plane EPS Optimization functionality is allowed in the cell. In one example, the RRC layer may reacquire the system information to determine whether the User Plane EPS Optimization functionality is allowed in the cell, when the RRC layer receives a RRC connection suspend request message from the network.

In one example, the EMM layer may enter an EMM_IDLE without suspend indication state, after receiving an indication from the RRC layer for indicating that the User Plane EPS Optimization functionality is not allowed in the cell. In one example, the EMM layer may enter an EMM_IDLE with suspend indication state, after receiving an indication from the RRC layer for indicating that the User Plane EPS Optimization functionality is allowed in the cell. In one example, the EMM layer in an EMM_IDLE state may request the RRC layer to resume a RRC connection, when the EMM layer initiates a service request procedure or an extended service request procedure.

In one example, the RRC layer may release (e.g., clear or remove) a context of the UE, when the RRC layer receives the system information indicating that the User Plane EPS Optimization functionality is not allowed in the cell, when the EMM layer transmits the RRC connection request message to the RRC layer, when the RRC layer receives a RRC connection setup message from the network, or when the RRC layer receives a RRC resume reject message from the network. In one example, the context may include at least one of a signaling radio bearer (SRB) configuration, a data radio bearer (DRB) configuration, a resume ID, a security configuration (e.g., security key), a cell radio network temporary identifier (C-RNTI), a physical layer cell ID (PCI), and a cell ID, which are received from (or used with) the network (e.g., a base station) that transmits a RRC connection suspend message to the UE.

Figure 4:
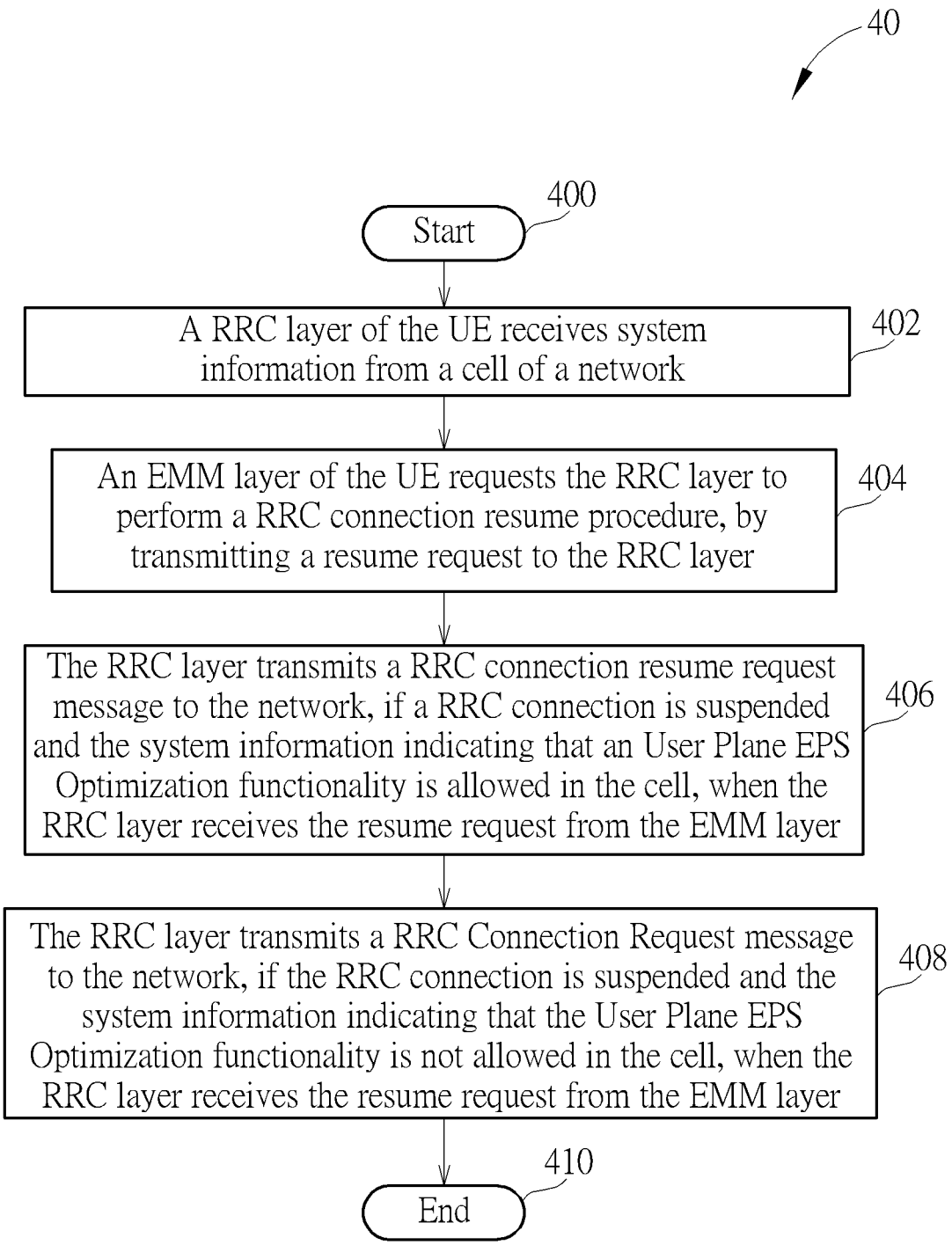
FIG. 4 is a flowchart of a process according to an example of the present invention.

FIG. 4 is a flowchart of a process 40 according to an example of the present invention. The process 40 may be utilized in a UE for handling a User Plane EPS Optimization procedure. The process 40 includes the following steps:

Step 400: Start.

Step 402: A RRC layer of the UE receives system information from a cell of a network.

Step 404: An EMM layer of the UE requests the RRC layer to perform a RRC connection resume procedure, by transmitting a resume request to the RRC layer.

Step 406: The RRC layer transmits a RRC connection resume request message to the network, if a RRC connection is suspended and the system information indicating that a User Plane EPS Optimization functionality is allowed in the cell, when the RRC layer receives the resume request from the EMM layer.

Step 408: The RRC layer transmits a RRC Connection Request message to the network, if the RRC connection is suspended and the system information indicating that the User Plane EPS Optimization functionality is not allowed in the cell, when the RRC layer receives the resume request from the EMM layer.

Step 410: End.

According to the process 40, a RRC layer of the UE may receive system information from a cell (e.g., a serving cell) of a network. An EMM layer of the UE may request the RRC layer to perform a RRC connection resume procedure, by transmitting a resume request to the RRC layer. Then, the RRC layer may transmit a RRC connection resume request message to the network, if a RRC connection is suspended and the system information indicating that a User Plane EPS Optimization functionality (e.g., a resume/suspend functionality) is allowed in the cell, when the RRC layer receives the resume request from the EMM layer. The RRC layer may transmit a RRC Connection Request message (e.g., RRCConnectionRequest) to the network, if the RRC connection is suspended and the system information indicating that the User Plane EPS Optimization functionality is not allowed in the cell, when the RRC layer receives the resume request from the EMM layer. That is, the RRC layer does not inform the EMM layer whether the User Plane EPS Optimization functionality is allowed in the cell. The RRC layer may determine to transmit the RRC connection resume request message or the RRC Connection Request message to the network, according to whether the User Plane EPS Optimization functionality is allowed in the cell, when the RRC layer is requested by the EMM layer to perform the RRC connection resume procedure. In other words, a RRC connection resume procedure is not performed (e.g., triggered) in a cell that does not support (allow) the User Plane EPS Optimization functionality. Thus, the problem of synchronizing the User Plane EPS Optimization functionality is solved according to the process 40.

Realization of the process 40 is not limited to the above description. The following examples may be applied to the process 40.

In one example, the RRC layer may receive a RRC Connection Setup message (e.g., RRCConnectionSetup) from the network, after transmitting the RRC Connection Request message. The UE may enter a connected mode, when the RRC layer receives the RRC Connection Setup message. The RRC layer may transmit a RRC Connection Setup Complete message (e.g., RRCConnectionSetupComplete) with a MME group ID and a MME group to the network. The UE may transmit (receive) data to (from) the network, after the RRC layer transmits the RRC Connection Setup Complete message to the network. The RRC layer may receive a RRC suspend request message from the network, when the UE is in the connected mode. The RRC layer may suspend a RRC connection and may transmit a suspend indication to the EMM layer, after receiving the RRC suspend request message. The EMM layer may enter an EMM_IDLE with suspended sub-state, when receiving the suspend indication.

In one example, the RRC layer may receive a RRC connection resume message from the network, after transmitting the RRC connection resume request message to the network. The RRC layer may transmit a RRC resume complete message to the network and may inform the EMM layer that the RRC connection resume is succeeded, after receiving the RRC connection resume message. The EMM layer may enter an EMM Connected state, after being informed that the RRC connection resume is succeeded.

In one example, the RRC layer may reacquire the system information to determine whether the User Plane EPS Optimization functionality is allowed in the cell, before transmitting the RRC connection resume request message or the RRC Connection Request message to the network, after receiving the resume request from the EMM layer, or after receiving a RRC connection suspended request message from the network.

In one example, the RRC layer may perform a cell selection/reselection procedure instead of informing the EMM layer that the User Plane EPS Optimization functionality is not allowed in the cell, and the RRC layer may transmit the RRC connection resume request message to the network, after the UE switches to a serving cell supporting (allowing) the User Plane EPS Optimization functionality. In one example, the RRC layer may inform the EMM layer that the User Plane EPS Optimization functionality is not allowed in the cell, when the RRC layer transmits the RRC Connection Request message to the network. In one example, the RRC layer may determine that the User Plane EPS Optimization functionality is not allowed in the cell, after receiving the resume request from the EMM layer and no RRC connection is suspended.

In one example, the EMM layer in an EMM_IDLE state may request the RRC layer to resume the RRC connection, when the EMM layer initiates a service request procedure or an extended service request procedure. In one example, the RRC layer may transmit the RRC Connection Request message to the network, after the RRC layer informs the EMM layer that the User Plane EPS Optimization functionality is not allowed in the cell and receives a connection request from the EMM layer for requesting the RRC layer to perform a RRC connection establishment procedure to the network.

In one example, the RRC layer may release (e.g., clear or remove) a context of the UE, when the RRC layer receives the system information indicating that the User Plane EPS Optimization functionality is not allowed in the cell, when the EMM layer transmits the RRC connection request message to the RRC layer, when the RRC layer receives a RRC connection setup message from the network, or when the RRC layer receives a RRC resume reject message from the network. In one example, the context may include at least one of a SRB configuration, a DRB configuration, a resume ID, a security configuration (e.g., security key), a C-RNTI, a PCI, and a cell ID, which are received from (or used with) the network (e.g., a base station) transmitting a RRC connection suspend message to the UE.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20. Any of the abovementioned processes may be compiled into the program code 214.

To sum up, the present invention provides a device and a method for handling a User Plane Evolved Packet System Optimization procedure. In one example, the RRC layer informs the EMM layer whether the User Plane EPS Optimization functionality is allowed in the cell, according to the received system information. In one example, the RRC layer may transmit the RRC connection resume request message or the RRC Connection Request message to the network, according to whether the User Plane EPS Optimization functionality is allowed in the cell. As a result, the problem of synchronizing the User Plane EPS Optimization functionality is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a User Plane Evolved Packet System (EPS) Optimization procedure, comprising:
   a storage unit, for storing instructions of:
   a radio resource control (RRC) layer of the communication device receiving system information from a cell of a network;
   the RRC layer informing an EPS mobility management (EMM) layer of the communication device that a User Plane EPS Optimization functionality is allowed in the cell, when the system information indicates that the User Plane EPS Optimization functionality is allowed;
   the RRC layer informing the EMM layer that the User Plane EPS Optimization functionality is not allowed in the cell, when the system information indicates that the User Plane EPS Optimization functionality is not allowed;
   the EMM layer indicating the RRC layer to perform a RRC connection resume procedure if the EMM layer initiates a first procedure to transmit a first EMM message or first data, after the EMM layer is informed by the RRC layer that the User Plane EPS Optimization functionality is allowed in the cell; and
   the EMM layer indicating the RRC layer to perform a RRC connection establishment procedure if the EMM layer initiates a second procedure to transmit a second EMM message or second data, after the EMM layer is informed by the RRC layer that the User Plane EPS Optimization functionality is not allowed in the cell;

wherein the User Plane EPS Optimization functionality comprises a resume functionality;

wherein the resume functionality is allowed in the cell when the system information indicates that the User Plane EPS Optimization functionality is allowed, and the resume functionality is not allowed in the cell when the system information indicates that the User Plane EPS Optimization functionality is not allowed; and a processing circuit, coupled to the storage unit, configured to execute the instructions stored in the storage unit.

2. The communication device of claim 1, wherein the RRC layer informs the EMM layer whether the User Plane EPS Optimization functionality is allowed in the cell, when a RRC connection is suspended and the RRC layer receives the system information or when the EMM layer requests the RRC layer to report a state of the User Plane EPS Optimization functionality.

3. The communication device of claim 2, wherein the RRC layer reacquires the system information to determine whether the User Plane EPS Optimization functionality is allowed in the cell, after the EMM layer requests the RRC layer to report the state of the User Plane EPS Optimization functionality, before the RRC layer transmits an indication to the EMM layer.

4. The communication device of claim 1, wherein the RRC layer transmits an indication to the EMM layer according to the system information to indicate whether the User Plane EPS Optimization functionality is allowed in the cell.

5. The communication device of claim 1, wherein the EMM layer enters an EMM_IDLE without suspend indication state, after receiving an indication from the RRC layer for indicating that the User Plane EPS Optimization functionality is not allowed in the cell. The EMM layer enters an EMM_IDLE with suspend indication state, after receiving an indication from the RRC layer for indicating that the User Plane EPS Optimization functionality is allowed in the cell.

6. The communication device of claim 1, wherein the EMM layer in an EMM_IDLE state requests the RRC layer to resume a RRC connection, when the EMM layer initiates a service request procedure or an extended service request procedure.

* * * * *